Aug. 29, 1967   M. RAMSAY   3,338,141
POWER-ACTUATED PISTON TOOL
Filed July 16, 1965   2 Sheets-Sheet 1

INVENTOR.
MARCUS RAMSAY
BY H. Samuel Kieser
ATTORNEY

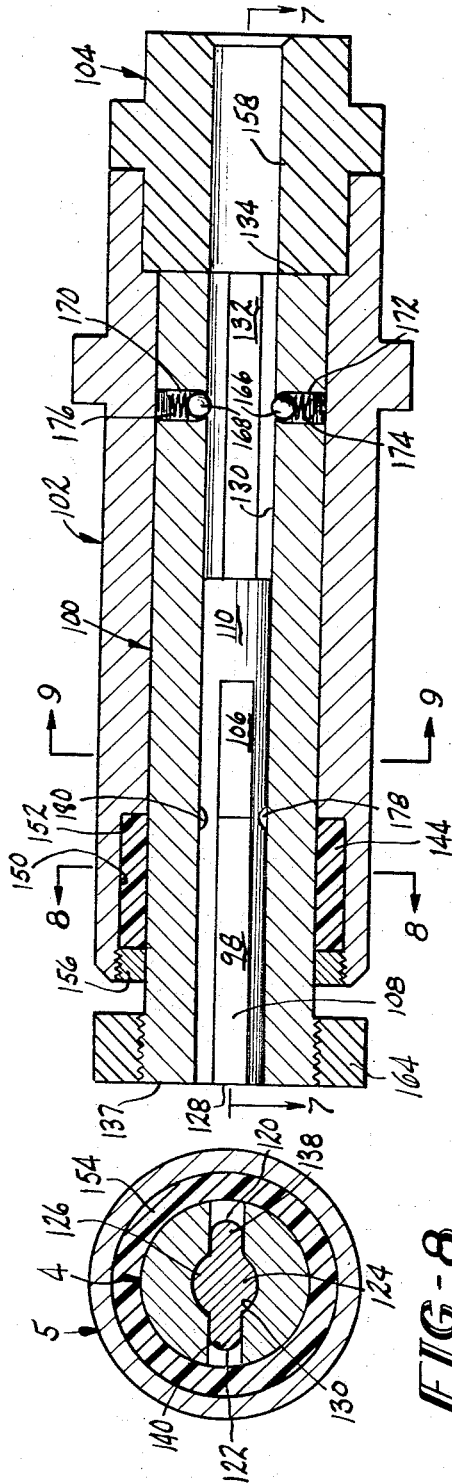
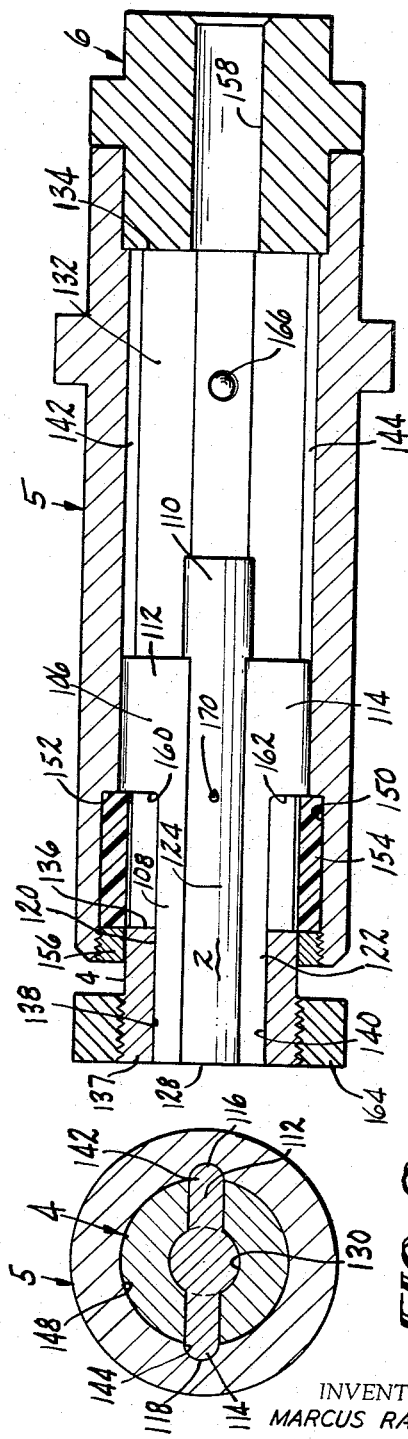

United States Patent Office 3,338,141
Patented Aug. 29, 1967

3,338,141
POWER-ACTUATED PISTON TOOL
Marcus Ramsay, New Haven, Conn., assignor to
Olin Mathieson Chemical Corporation
Filed July 16, 1965, Ser. No. 472,579
11 Claims. (Cl. 92—30)

ABSTRACT OF THE DISCLOSURE

A piston and barrel arrangement for a fastener driving tool wherein the barrel is provided with a bore having longitudinally extending slots communicating therewith and the piston has a first portion riding in the slots and a second portion extending rearwardly from the forward edge of the piston in contact with the walls of the bore.

---

This invention relates generally to power actuated tools for driving fasteners into masonry, steel, concrete, or the like, and more particularly, to a piston and barrel arrangement for such tools.

Conventional power tools utilize pistons having two or more diameters throughout their length. The reason for such construction is that the smaller diameter portion, or shank portion, of the piston acts upon the fastener to drive the fastener through the fastener guide and into the workpiece. The larger diameter portion of the piston forms the head upon which the gases act. With such a piston, conventional power tools must include a two-diameter barrel. The smaller diameter portion of the barrel positions and guides the fastener. The larger diameter portion guides the head of the piston.

Due to such construction, the length of the shank portion of the piston must be at least as long as the longest fastener which is to be used in the tool. In addition, the overall length of the piston must be such that it provides an adequate length for the head portion, for any buffering action that might take place, and the desired overtravel distance.

Such conventional arrangements have several inherent disadvantages. The piston must be relatively long which results in a relatively low piston velocity. The increase in length of the piston necessarily results in a relative increase in the mass of the piston whereby excessive recoil is a problem. Moreover, due to the particular barrel configuration, the shank portion of the piston is not properly supported during the first portion of the power stroke of the piston which contributes to early piston failure. Piston failure is also caused by the fact that the cross-sectional area of the reduced portion of the piston is only as large as that of the fastener head.

It is, therefore, an object of this invention to provide a piston and barrel assembly for a power actuated tool whereby piston failure will be reduced.

A more specific object of the present invention is to provide a piston and barrel arrangement for a power actuated tool where a piston is capable of obtaining higher velocities with less recoil.

Yet another object of the present invention is to provide a shorter piston for a power actuated tool whereby the length of the tool may be substantially decreased.

These and other objects may be realized through the provision of a piston having a larger cross-sectional area throughout its length than that of the head of a fastener. The piston is fully supported throughout its length during the entire stroke and its length is independent of the length of the fastener used in the tool.

The invention may be more readily understood by reference to the following description of several embodiments of the present invention and the accompanying drawing in which:

FIGURE 6 is a longitudinal sectional view of a second form of a tool constructed in accordance with the present invention;

FIGURE 7 is a longitudinal sectional view taken along the lines 7—7 of FIGURE 6;

FIGURE 8 is a transverse sectional view taken along the lines 8—8 of FIGURE 6; and FIGURE 9 is a transverse sectional view taken along the lines 9—9 of FIGURE 6.

Figure 1:
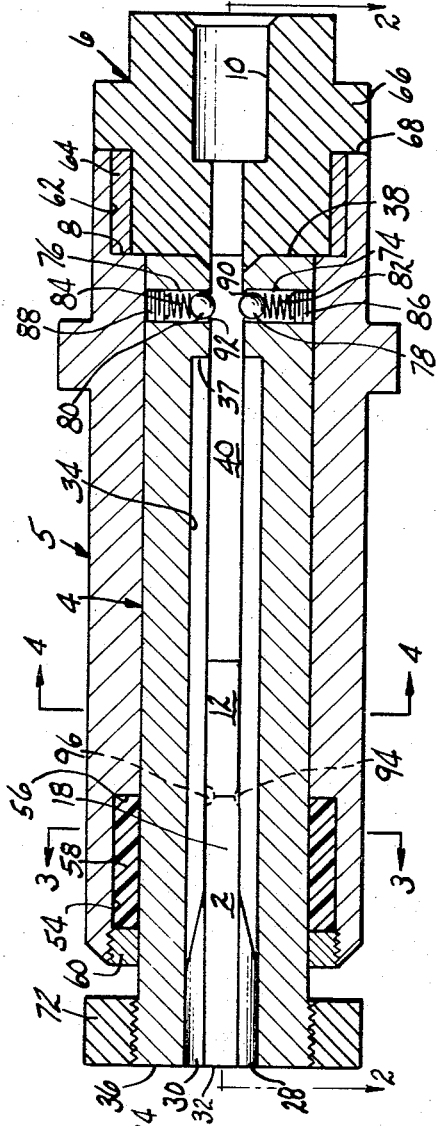
FIGURE 1 is a longitudinal sectional view showing one form of a tool constructed in accordance with the present invention.

Referring to the drawings, FIGURES 1-5 show one modification of a tool made in accordance with the present invention. Generally, the tool comprises a piston member 2 disposed in a barrel member 4. A hollow, generally cylindrical, sleeve member 5, is disposed about the barrel member 4. A breech member 6 is received within a counterbore 8 in the sleeve member 5. The breech member includes a chamber 10 for receiving a cartridge.

The piston member 2 includes a head portion 12 having a greater width than thickness. The side edges of the head portion may be rounded as indicated at 14 and 16 in FIGURE 4.

Figure 2:
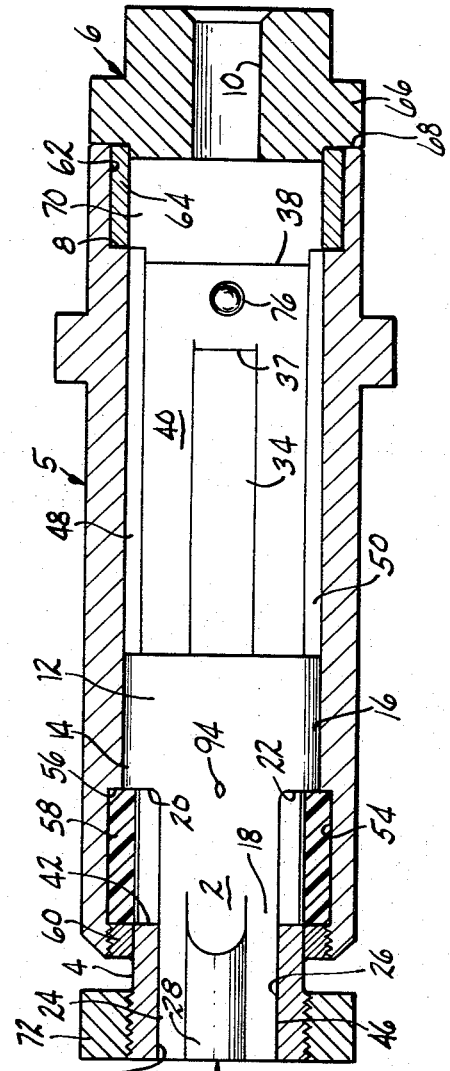
FIGURE 2 is a longitudinal sectional view taken along the lines 2—2 of FIGURE 1.
Figures 3, 5:
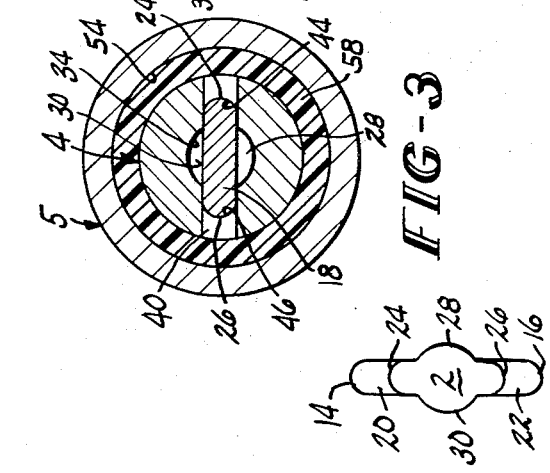
FIGURE 3 is a transverse sectional view taken along the lines 3—3 of FIGURE 1.
FIGURE 5 is an end view of the piston member shown in FIGURES 1-4.
Figure 4:
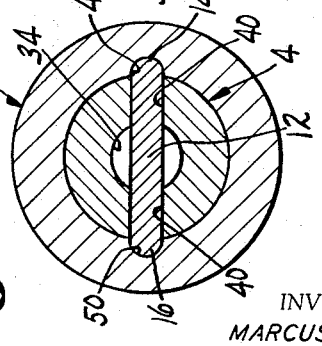
FIGURE 4 is a transverse sectional view taken along the lines 4—4 of FIGURE 1.

The piston member 2 includes a ram portion 18, also having a greater width than thickness. However, as can be seen in FIGURE 2, the width of the ram portion 18 is less than the width of the head portion 12 such that two shoulder portions 20 and 22 are formed on the forward face of the head portion 12, on opposite sides of the ram portion 18. The side edges of the ram portion may be rounded as indicated at 24 and 26 in FIGURE 3.

The ram portion may also include convex projections 28 and 30 extending outwardly on either side of the piston member 2. The projections 28 and 30 extend from the forward face 32 of the piston member 2 a portion of the way along the ram portion 18. As can be seen particularly in FIGURE 3, the surfaces of the convex projections, in cross section, are arcs of the same circle. It will be noted that the diameter of such circle is less than the width of the ram portion 18.

The barrel member 4 has a cylindrical bore 34 extending from its forward face 36 to a point 37 short of the rear face 38. The diameter of this bore should be substantially equal to the diameter of the circle formed by the outer surfaces of the projections 28 and 30.

A slot 40 through the barrel member 4 extends from the rear face 38 of the barrel member 4 to a point 42 near the forward face 36. From point 42 to the forward face 36 of the barrel member 4, the internal surface of the barrel member 4 has oppositely disposed grooves 44 and 46 which lie generally in the same plane as the slot 40. The grooves 44 and 46 have a configuration such that they will receive the rounded side edges 24 and 26 of the ram portion 18 of the piston member 2.

The sleeve member 5 includes oppositely disposed grooves 48 and 50 in its internal surface 52. The grooves 48 and 50 lie in the same plane as the slot 40. As can be seen particularly in FIGURE 4, the oppositely disposed grooves 48 and 50 form continuations of the slot 40 in the barrel member 4. The grooves should have a configuration such that they will receive the side edges 24 and 26 of the head portion 12 of the piston member 2.

The forward end of the sleeve member 5 has a counterbore 54 terminating in a bottom surface 56. Mounted within the counterbore 54 and disposed about the barrel member 4 is a buffer member 58. The buffer member is retained within the counterbore by a retaining ring 60 threadedly secured to the forward end of the sleeve 5.

The rearward end of the sleeve member 5 is counterbored as indicated at 62. A spacing ring 64 is mounted within the counterbore. The breech member 6 is disposed inside the spacing ring 64 within the counterbore 62 and has a flange 66 in engagement with the end face 68 of the sleeve member. The breech member 6 has a slot 70 extending from its forward face to the cartridge chamber. When the breech member 6 is assembled within the counterbore 62, the slot 70 should lie in the same plane as the slot 40 of the barrel member and should be configured such that it will receive the head portion 12 of the piston member.

As can be seen in FIGURE 2, the buffer member 58 acts as an abutment for the piston member 2. In the event that the tool is fired when not positioned against a suitable surface, the energy of the piston will be absorbed by the buffer member when the shoulder portions 20 and 22 of the piston member engage the buffer 58. This will not only prevent damage to the piston or tool, but will also reduce the danger of the piston breaking from the tool and being propelled into flight.

The barrel member 4 includes at its forward end a ring member 72, threadedly secured thereto, and having an external diameter substantially equal to the sleeve member 5. Oppositely disposed, radially extending, bores 74 and 76 are positioned near the rearward end of the barrel member 4. Ball members 78 and 80 are mounted in the bores and are spring biased radially inwardly by springs 82 and 84. Plugs 86 and 88 are threadedly secured within the bores 74 and 76, respectively, to provide an abutment surface for the springs. The balls are limited in their inward movement by lip portions 90 and 92 surrounding the bores 74 and 76 respectively.

After firing of the tool, the operator may grasp the ring member 72 and pull the barrel member forward relative to the sleeve member 5. The piston member 2 will remain stationary due to its abutment against the buffer member 58. The operator may pull the barrel member 4 forward until the ball members engage the detents 94 and 96 on the piston member. Upon pushing the barrel member 4 back into the sleeve member, the piston member 2 will move along with the barrel member 4 due to the engagement of the ball members 78 and 80 in the detents 94 and 96 whereby the piston member 2 will be returned to its proper position for firing.

By virtue of the above-described arrangement, the cylindrical bore 34 in the barrel member 4 will provide a support for the head of the fastener to be used in the tool. As can be seen, the length of the ram portion 18 of the piston member 2 is not dependent upon the length of the fastener to be used, but need only be as long as the combined length of the buffer member 58 and the portion of the barrel member 4 which extends forwardly of the sleeve member 5. Moreover, the projections 28 and 30 on the ram portion 18 of the barrel member 4 provide support for the forward end of the ram portion throughout the entire stroke of the piston. The head portion 12 of the piston member 2 is supported on opposite sides by the slot 40 in the barrel member 4 during the entire stroke. Additional support is given to the piston by virtue of the engagement of the ram portion 18 with the slot 40.

Since the length of the piston member 2 is not dependent upon the length of a fastener, the ram portion 18 may be made as short as practical. With the shortening of the piston member 2, the overall length of the tool may be reduced. The shortening of piston member 2 also results in a decrease in its weight, whereby it can obtain higher velocities yet undergo less recoil at the end of the stroke. By virtue of the particular design of the ram portion 18 and the convex projections 28 and 30 thereon, the cross-sectional area of the ram portion is greater than the cross-sectional area of the head of the fastener, providing a stronger piston and resulting in a longer piston life.

Referring to FIGURES 6–9, a slightly different piston configuration is used to provide numerous advantages of this invention. The tool shown in FIGURES 6–9 may generally comprise a piston member 98, barrel member 100, sleeve member 102, and a breech member 104.

The piston member 98 includes a head portion 106 and ram portion 108. The head portion 106 has a greater width than thickness and includes a cylindrical extension 110 extending from its rearward end. The diameter of the cylindrical extension should be greater than the thickness of the piston member 98. The side edges 112 and 114 of the head portion 106 may be rounded as indicated at 116 and 118, similar to the first modification. The ram portion 108 is of lesser width than the head portion 106 and may have its side edges rounded as indicated at 120 and 122.

Convex projections 124 and 126 extend on opposite sides of the piston member 98 and extend from the forward face 128 thereof rearwardly the entire length of the piston. The projections are continuations of the cylindrical extension 110.

The barrel member includes a longitudinal bore 130 which extends the entire length thereof. The longitudinal bore should have a diameter substantially equal to that of the cylindrical extension 110. The barrel also includes a slot 132 extending from the rearward face 134 to a point 136 short of the forward face 137. Oppositely disposed grooves 138 and 140 extend from the point 136 to the forward face 137 of the barrel member 100 and lie in the same plane as the slot 132.

The sleeve member 102 includes oppositely disposed grooves 142 and 144 in its internal surface 148 which form continuations of the slot 132 in the barrel member. The grooves 142 and 144 should have a configuration such that they will slidably receive the rounded side edges 116 and 118 of the head portion 106 of the piston member 98.

The forward end of the sleeve member 102 has a counterbore 150 terminating in a bottom surface 152. Mounted in the counterbore is a buffer member 154 which is disposed about the barrel member and is seated against the bottom of the counterbore. The buffer member is retained within the counterbore by a retaining ring 156 threadedly secured to the forward end of the sleeve member 102.

The breech plug includes a longitudinally extending bore 158 which has a diameter sufficient to properly receive a cartridge member. In the particular example shown, the diameter of the cartridge chamber is substantially equal to that of the cylindrical extension 110 of the piston member 98. Therefore, the bore 158 in the breech member 104 has a substantially constant diameter. In the event that it is desired to utilize a larger cylindrical extension on the piston member, the forward end of the breech member should be counterbored to provide sufficient clearance for reception of the cylindrical extension.

As in the first modification, the buffer ring 154 provides an abutment for the shoulders 160 and 162 of the head portion of the piston member 98 and will absorb the energy of the moving piston in the event of free flight firing or overdrive of the piston. Moreover, the provision of the ring member 164 threadedly secured to the forward end of the barrel member, along with the ball members 166 and 168 provided in oppositely disposed radially extending bores 170 and 172 respectively provide means for returning the piston member 98 after the driving operation. As in the first modification, each of the ball members 170 and 172 are spring biased forwardly by springs 174 and 176 respectively and are adapted to engage detents 178 and 180 in the piston member 98.

It can be seen that the ram portion 108 of the piston member 98 need only be as long as the combined length of the buffer member 154 and the portion of the barrel member 100 which extends from the sleeve member 102. Thus, it is not dependent upon the length of a fastener member. Moreover, the cylindrical etxension 110, along with the convex projections 124 and 126 which extend along the entire length of the piston member 98 provide support for the piston throughout its entire stroke. Additional support is given to the piston member 98 by virtue of the fact that opposite sides of the head and ram portions of the piston are engaged by the walls of the slots in the barrel member.

The fastener is supported for firing by the bore 130 in the barrel member. As will be noted, the bore has substantially the same diameter as that of the cylindrical extension and convex projections. Thus, it will be seen that the ram portion of the piston has a greater cross-sectional surface area than that of the fastener, providing a stronger piston and permitting a longer piston life. The length of the piston may be substantially reduced over that of conventional pistons, thereby reducing the overall tool length and the mass of the piston.

In both modifications, it has been found that the ideal configuration is such that the thickness of the piston, exclusive of the projections, be approximately 70 percent of the diameter of the circle formed by the projections.

While reference has been made to specific examples embodying the present invention, various modifications and alterations will readily suggest themselves to those skilled in the art, and the scope of this invention should therefore be ascertained by the following claims.

What is claimed is:

1. A power-actuated tool including sleeve means having a longitudinally extending bore defined by an internal surface, a counterbore in one end of said sleeve means, hollow buffer ring means within said counterbore having an internal surface coextensive with said internal surface of said sleeve means, means axially retaining said buffer ring means within said counterbore, at least one longitudinally extending groove in the internal surface of said sleeve member, barrel means slidably disposed in said sleeve means and having a forward portion extending from the one end thereof, said barrel means having a longitudinal bore and at least one longitudinal slot communicating with said barrel bore, said slot having a first portion coextensive with said groove in said sleeve member and a second portion adjacent the forward portion of said barrel means having a reduced depth, and piston means slidably mounted in said barrel, said piston means having a first portion engaging said barrel bore, a second portion projecting through said first portion of said slot into engagement with said groove in said sleeve means, and a third portion having a width substantially equal to the depth of the second portion of said slot.

2. A power-actuated tool including sleeve means having a longitudinally extending bore defined by an internal surface, a counterbore in one end of said sleeve means, hollow buffer ring means within said counterbore having an internal surface coextensive with said internal surface of said sleeve means, means axially retaining said buffer ring means within said counterbore, oppositely disposed grooves in the internal surface of said sleeve member, barrel means slidably disposed in said sleeve means and having a forward portion extending from the one end thereof, said barrel means having a longitudinal bore and oppositely disposed slots communicating with said barrel bore, each of said slots having a first portion coextensive with one of said grooves in said sleeve member and a second portion adjacent the forward portion of said barrel means having a reduced depth, and piston means slidably mounted in said barrel, said piston means having a first portion engaging said barrel bore, a second portion projecting through said first portion of each of said slots into engagement with said grooves in said sleeve means, and a third portion having a width substantially equal to the depth of the second portion of said slots.

3. The power-actuated tool of claim 2 wherein said second and third portions have a greater width than thickness and said first portion extends on opposite sides of at least said third portion.

4. The power-actuated tool of claim 3 further including a cylindrical extension on said piston, said cylindrical extension having a surface coextensive with the first portion of said piston.

5. The power-actuated tool of claim 3 wherein the thickness of each of said second and third portions is about 70% of the thickness of said first portion.

6. A power-actuated tool including sleeve means having oppositely disposed, longitudinally extending grooves in the internal surface thereof, a counterbore in said sleeve means, hollow buffer means disposed within said counterbore and having an internal surface coextensive with the internal surface of said sleeve means, means axially securing said buffer means in said counterbore, barrel means slidably disposed within said sleeve means, said barrel means having a longitudinal bore and slot means extending therethrough, said slot means including a first portion extending from the rearward face of said barrel means to a point adjacent its forward face and a second portion extending from said point to the forward face of said barrel, said first portion being coextensive with said grooves in said sleeve means, said second portion having a lesser depth than said first portion, and piston means slidably disposed within said barrel, said piston means having a first portion in engagement with said bore and second and third portions in engagement with said slot means, said second portion of said piston means having a greater width than thickness and having a greater width than said third portion of said piston means, said second portion also extending into engagement with said grooves in said sleeve member, oppositely disposed and radially extending holes in said barrel member near the rearward face thereof, spring biased ball means positioned in each of said holes, and detent means on opposite sides of said piston member adapted to be engaged by said ball members.

7. A power-actuated tool including barrel means having a breech end and a muzzle end, said barrel means including a longitudinally extending bore defined by arcuate wall means and a plurality of circumferentially spaced longitudinal slots extending rearwardly from said muzzle end and communicating with said bore, each of said slots being defined by wall means, and piston means having a muzzle end and a breech end slidably mounted in said barrel, said piston means including a first portion extending the entire length of said piston in engagement with the wall means of each of said longitudinally extending slots, and a second portion extending rearwardly from said muzzle end at least a portion of the length of said piston and including arcuate surface means in sliding contact with the arcuate surface means of said bore, said piston means further including a piston projection, said projection extending rearwardly from the breech end of said piston means and having surface means in sliding contact with the arcuate wall means of said bore.

8. A power-actuated tool including barrel means having a rearward end and a forward end, said barrel means including a longitudinally extending cylindrical bore defined by arcuate wall means and at least one longitudinally extending slot extending rearwardly from said forward end and in communication with said bore and defined by spaced parallel wall means, and piston means having a forward end and rearward end movably disposed in said barrel means, said piston means having a first portion extending the entire length thereof with a greater width than thickness and contacting said spaced parallel wall means along the length thereof, said first portion having a greater width at the rearward end than at the forward end, and a second portion extending rearwardly from the forward end of said piston and including arcuate surface means in sliding contact with the arcuate surface means of said bore.

9. The power-actuated tool of claim 8 further including a piston projection, said projection extending from the rearward end of said piston means and having surface means in contact with the arcuate wall means of said bore, and wherein said second portion extends the entire length of said piston and is in contact with said arcuate wall means throughout its length.

10. A power-actuated tool including barrel means having a forward and rearward end, said barrel means having a longitudinally extending bore defined by arcuate internal wall means, oppositely disposed longitudinally extending slots in said barrel means communicating with said bore, each slot being defined by spaced parallel wall means, and piston means including a forward end and rearward end slidably mounted in said barrel means, said piston means including a first portion extending the entire length thereof having a greater width than thickness and slidably contacting the spaced parallel wall means of each slot, said first portion having a greater width at the rearward end than at the forward end, and a second portion on both sides of said first portion extending rearwardly from the forward end of the piston at least a portion of the length thereof and being defined by arcuate surface means in sliding contact with the arcuate surface means of said bore along the entire length of said second portion.

11. The power-actuated tool of claim 10 further including a piston projection, said projection extending from the rearward end of said piston means and having surface means in contact with the arcuate wall means of said bore, and wherein said second portion extends the entire length of said piston and is in contact with said arcuate wall means throughout its length.

References Cited

UNITED STATES PATENTS

| | | | |
|---|---|---|---|
| 132,373 | 10/1872 | Sellers | 173—127 |
| 1,380,397 | 6/1921 | Levedahl | 92—255 X |
| 2,363,605 | 11/1944 | McLintock | 92—255 X |
| 2,461,527 | 2/1949 | Curtis et al. | 173—127 X |
| 3,480,451 | 8/1949 | De la Torre | 173—126 X |
| 2,703,557 | 3/1955 | Polki | 92—177 X |
| 2,820,433 | 1/1958 | Pyk | 92—172 X |
| 2,831,462 | 4/1958 | Fischer | 92—255 X |
| 2,850,738 | 9/1958 | Campbell et al. | 173—127 X |
| 2,877,750 | 3/1959 | Maier | 60—26.1 |
| 3,104,395 | 9/1963 | Grey et al. | 173—127 X |
| 3,105,238 | 10/1963 | Halti | 227—10 |
| 3,181,760 | 5/1965 | Catlin et al. | 227—10 |
| 3,268,013 | 8/1966 | Sussman | 173—53 |

EDGAR W. GEOGHEGAN, *Primary Examiner.*

MARTIN P. SCHWADRON, *Examiner.*

I. C. COHEN, *Assistant Examiner.*